(12) United States Patent
Hutchison et al.

(10) Patent No.: US 8,687,483 B2
(45) Date of Patent: Apr. 1, 2014

(54) PARALLEL TRAFFIC GENERATOR WITH PRIORITY FLOW CONTROL

(75) Inventors: Michael Hutchison, Richmond (CA); Christopher Kowalski, Surrey (CA); Robert Luking, Ellicott City, MD (US)

(73) Assignee: Ixia, Calabasas, CA (US)

( * ) Notice: Subject to any disclaimer, the term of this patent is extended or adjusted under 35 U.S.C. 154(b) by 79 days.

(21) Appl. No.: 13/240,746

(22) Filed: Sep. 22, 2011

(65) Prior Publication Data

US 2013/0077500 A1 Mar. 28, 2013

(51) Int. Cl.
*H04L 12/26* (2006.01)
*G08C 15/00* (2006.01)
*H04L 12/28* (2006.01)
*G06F 15/173* (2006.01)
*G06F 15/16* (2006.01)

(52) U.S. Cl.
USPC ........ 370/229; 370/241; 370/395.4; 370/412; 370/429; 709/232; 709/238

(58) Field of Classification Search
USPC .............. 370/252, 412, 235, 229, 241, 395.4, 370/429; 709/232, 238
See application file for complete search history.

(56) References Cited

U.S. PATENT DOCUMENTS

| | | | |
|---|---|---|---|
| 5,343,463 A | 8/1994 | van Tetering et al. | |
| 5,600,632 A | 2/1997 | Schulman | |
| 5,956,341 A | 9/1999 | Galand et al. | |
| 6,028,847 A | 2/2000 | Beanland | |
| 6,108,800 A | 8/2000 | Asawa | |
| 6,122,670 A | 9/2000 | Bennett et al. | |
| 6,148,277 A | 11/2000 | Asava | |
| 6,345,302 B1 | 2/2002 | Bennett et al. | |
| 6,456,590 B1 | 9/2002 | Ren et al. | |
| 6,570,853 B1 * | 5/2003 | Johnson et al. | 370/236 |
| 6,789,100 B2 | 9/2004 | Nemirovsky | |
| 6,944,186 B2 | 9/2005 | Zaun et al. | |
| 6,950,405 B2 | 9/2005 | Van Gerrevink | |

(Continued)

OTHER PUBLICATIONS

Cisco Systems, Priority Flow Control: Build Reliable Layer 2 Infrastructure, Cisco Systems, Inc., Priority Flow Control: Build Reliable Layer 2 Infrastructure, http://www.cisco.com/en/US/prod/collateral/switches/ps9441/ps9670/white_paper_c11-542809.pdf, 2009, pp. 1-8.

(Continued)

*Primary Examiner* — Alpus H Hsu
*Assistant Examiner* — Anthony Luo
(74) *Attorney, Agent, or Firm* — SoCal IP Law Group LLP; John E. Gunther; Steven C. Sereboff

(57) ABSTRACT

An apparatus to generate test traffic for testing a network. A scheduler may provide packet definition data for a sequence of packets, each packet associated with a respective flow control group. A channelized schedule FIFO (first-in first-out) queue may store the packet definition data. The channelized schedule FIFO queue may include multiple parallel channels, each channel dedicated to storing packet definition data associated with a corresponding flow control group. A plurality of non-channelized packet builder lanes may build packets in accordance with packet definition data read from the channelized schedule FIFO. A channelized output FIFO buffer may store packets built by the plurality of packet builder lanes. The channelized output FIFO buffer may include multiple parallel channels, each channel dedicated to storing packets associated with a corresponding flow control group. An output multiplexor may interleave packets from the channelized output FIFO buffer to form the test traffic.

15 Claims, 8 Drawing Sheets

(56) References Cited

U.S. PATENT DOCUMENTS

| | | |
|---|---|---|
| 7,477,600 B1 | 1/2009 | Mor et al. |
| 7,769,049 B2 | 8/2010 | Pepper et al. |
| 8,036,123 B1 * | 10/2011 | Cohen .......................... 370/235 |
| 8,234,653 B1 * | 7/2012 | Carney et al. ................. 718/105 |
| 8,248,945 B1 | 8/2012 | Sathe et al. |
| 2002/0080781 A1 | 6/2002 | Gustavsson |
| 2005/0271071 A1 * | 12/2005 | Madhavapeddi et al. ..... 370/412 |
| 2008/0298380 A1 * | 12/2008 | Rittmeyer et al. ............ 370/412 |
| 2009/0073881 A1 | 3/2009 | Cui |
| 2011/0002262 A1 * | 1/2011 | Wang et al. ................... 370/328 |
| 2011/0261698 A1 | 10/2011 | Kamerkar et al. |

OTHER PUBLICATIONS

European Patent Office, European Search Report for European Application No. 12005824.3, mail date Jan. 23, 2013, pp. 1-4.

* cited by examiner

PARALLEL TRAFFIC GENERATOR WITH PRIORITY FLOW CONTROL

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to generating traffic for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols. Layers 1, 2, and 3 of the structure are the physical layer, the data link layer, and the network layer, respectively.

Layer 1 protocols define the physical (electrical, optical, or wireless) interface between nodes of the network. Layer 1 protocols include various Ethernet physical configurations, the Synchronous Optical Network (SONET) and other optical connection protocols, and various wireless protocols such as WiFi.

Layer 2 protocols govern how data is logically transferred between nodes of the network. Layer 2 protocols include the Ethernet, Asynchronous Transfer Mode (ATM), Frame Relay, and Point to Point Protocol (PPP).

Layer 3 protocols govern how packets are routed from a source to a destination along paths connecting multiple nodes of the network. The dominant layer 3 protocols are the well-known Internet Protocol version 4 (IPv4) and version 6 (IPv6). A packet switched network may need to route IP packets using a mixture of the Ethernet, ATM, FR, and/or PPP layer 2 protocols. At least some of the nodes of the network may include a router that extracts a destination address from a network layer header contained within each packet. The router then used the destination address to determine the route or path along which the packet should be retransmitted. A typical packet may pass through a plurality of routers, each of which repeats the actions of extracting the destination address and determining the route or path along which the packet should be retransmitted.

In order to test a packet switched network or a device included in a packet switched communications network, test traffic comprising a large number of packets may be generated, transmitted into the network at one or more ports, and received at different ports. Each packet in the test traffic may be a unicast packet intended for reception at a specific destination port or a multicast packet, which may be intended for reception at two or more destination ports. In this context, the term "port" refers to a communications connection between the network and the equipment used to test the network. The term "port unit" refers to a module within the network test equipment that connects to the network at a port. The received test traffic may be analyzed to measure the performance of the network. Each port unit connected to the network may be both a source of test traffic and a destination for test traffic. Each port unit may emulate a plurality of logical source or destination addresses. The number of port units and the communications paths that connect the port units to the network are typically fixed for the duration of a test session. The internal structure of the network may change during a test session, for example due to failure of a communications path or hardware device.

A series of packets originating from a single port unit and having a specific type of packet and a specific rate will be referred to herein as a "stream." A source port unit may support multiple outgoing streams simultaneously and concurrently, for example to accommodate multiple packet types, rates, or destinations. "Simultaneously" means "at exactly the same time." "Concurrently" means "within the same time."

Within this description, the term "engine" means a collection of hardware, which may be augmented by firmware and/or software, which performs the described functions. An engine may typically be designed using a hardware description language (HDL) that defines the engine primarily in functional terms. The HDL design may be verified using an HDL simulation tool. The verified HDL design may then be converted into a gate netlist or other physical description of the engine in a process commonly termed "synthesis". The synthesis may be performed automatically using a synthesis tool. The gate netlist or other physical description may be further converted into programming code for implementing the engine in a programmable semiconductor device such as a field programmable gate array (FPGA), a programmable logic device (PLD), a programmable logic arrays (PLA), or other programmable device. The gate netlist or other physical description may be converted into process instructions and masks for fabricating the engine within an application specific integrated circuit (ASIC).

An "engine" may be given a more descriptive name where appropriate. Within this description, various engines have been given names that include one of the nouns "scheduler", "distributor", "builder", "multiplexer", "generator", and "receiver".

Within this description, the term "logic" also means a collection of hardware that performs a described function, which may be on a smaller scale than an "engine". "Logic" encompasses combinatorial logic circuits; sequential logic circuits which may include flip-flops, registers and other data propagating elements; and complex sequential logic circuits such as finite-state machines.

Within this description, a "unit" also means a collection of hardware, which may be augmented by firmware and/or software, which may be on a larger scale than an "engine". For example, a unit may contain multiple engines, some of which may perform similar functions in parallel. The terms "logic", "engine", and "unit" do not imply any physical separation or demarcation. All or portions of one or more units and/or engines may be collocated on a common card, such as a network card, or within a common FPGA, ASIC, or other circuit device.

When one or more engine, logic circuit, and/or unit is implemented by a one or more programmable semiconductor devices, programming code may be stored on a computer readable storage medium. The programming code may then be used to configure the programmable device or devices. The storage medium may be, for example, a magnetic medium such as a hard disk, a floppy disk and a magnetic tape; an optical medium such as a compact disk (CD-ROM and CD-RW) and a digital versatile disk (DVD and DVD±RW); a flash memory card; or another physical object for storing data. The term "storage medium" does not encompass transitory media such as propagating waveforms and signals.

Throughout this description, elements appearing in block diagrams are assigned three-digit reference designators, where the most significant digit is the figure number where the element is introduced and the two least significant digits are specific to the element. An element that is not described in conjunction with a block diagram may be presumed to have the same characteristics and function as a previously-described element having the same reference designator.

In block diagrams, arrow-terminated lines may indicate data paths rather than signals. Each data path may be multiple bits in width. For example, each data path may consist of 4, 8, 16, 64, 256, or more parallel connections.

DETAILED DESCRIPTION

Description of Apparatus

Figure 1:
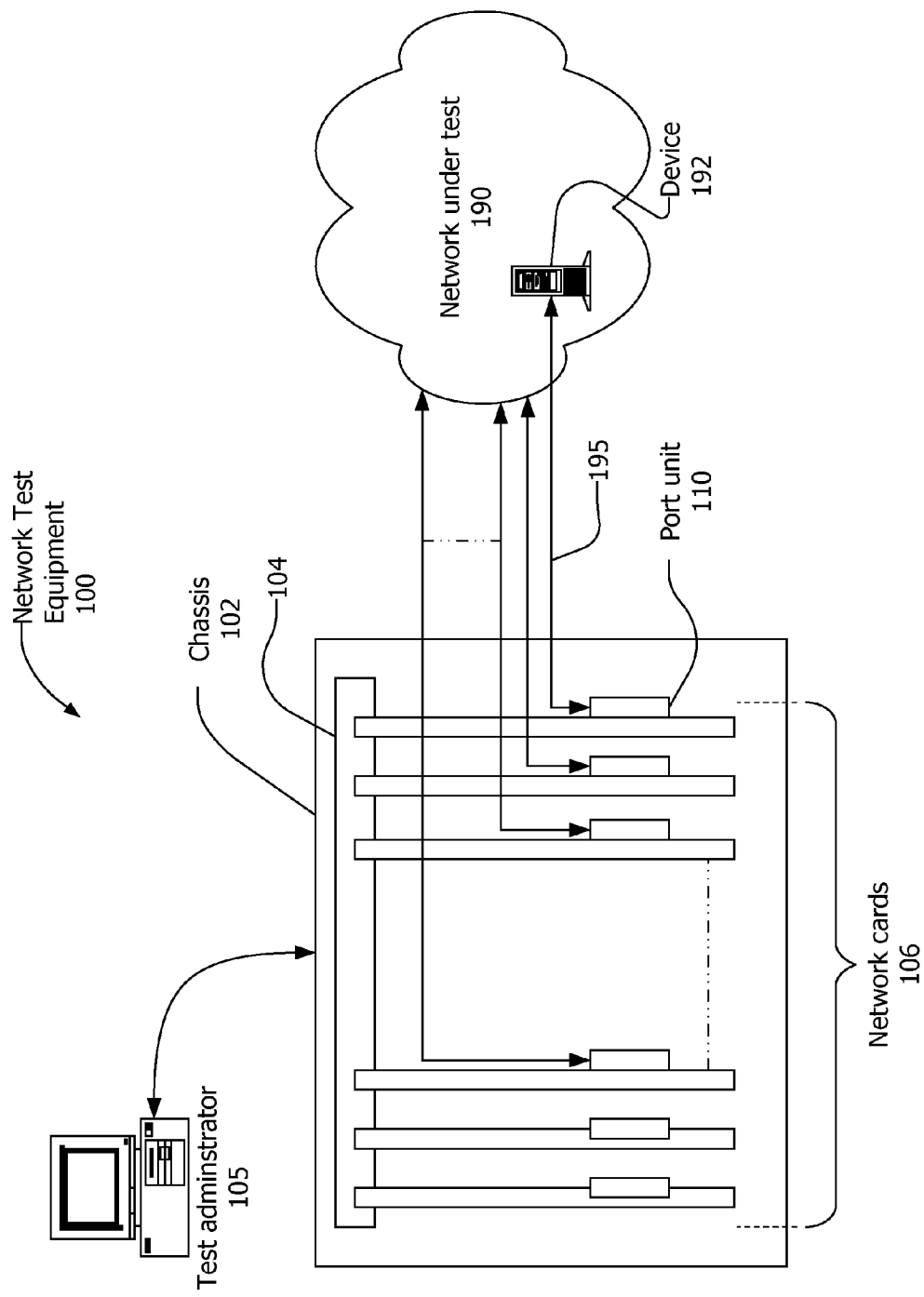
FIG. 1 is a block diagram of a network environment.

FIG. 1 shows a block diagram of a network environment. The environment may include network test equipment 100, a network 190 and plural network devices 192.

The network test equipment 100 may be a network testing device, performance analyzer, conformance validation system, network analyzer, or network management system. The network test equipment 100 may include one or more network cards 106 and a backplane 104 contained or enclosed within a chassis 102. The chassis 102 may be a fixed or portable chassis, cabinet, or enclosure suitable to contain the network test equipment. The network test equipment 100 may be an integrated unit, as shown in FIG. 1. Alternatively, the network test equipment 100 may comprise a number of separate units cooperative to provide traffic generation and/or analysis. The network test equipment 100 and the network cards 106 may support one or more well known standards or protocols such as the various Ethernet and Fibre Channel standards, and may support proprietary protocols as well.

The network cards 106 may include one or more field programmable gate arrays (FPGAs), application specific integrated circuits (ASICs), programmable logic devices (PLDs), programmable logic arrays (PLAs), processors and other kinds of devices. In addition, the network cards 106 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. Each network card 106 may contain one or more port unit 110. Each port unit 110 may connect to the network 190 through one or more ports. Each port unit 110 may be connected to the network 190 through a communication medium 195, which may be a wire, an optical fiber, a wireless link, or other communication medium. Each network card 106 may support a single communications protocol, may support a number of related protocols, or may support a number of unrelated protocols. The network cards 106 may be permanently installed in the network test equipment 100 or may be removable.

The backplane 104 may serve as a bus or communications medium for the network cards 106. The backplane 104 may also provide power to the network cards 106.

The network devices 192 may be any devices capable of communicating over the network 190. The network devices 192 may be computing devices such as workstations, personal computers, servers, portable computers, personal digital assistants (PDAs), computing tablets, cellular/mobile telephones, e-mail appliances, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, and multiplexers. In addition, the network devices 192 may include appliances, alarm systems, and any other device or system capable of communicating over a network.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein as packets. The network test equipment 100 and the network devices 192 may communicate simultaneously with one another, and there may be plural logical communications paths between the network test equipment 100 and a given network device 195. The network itself may be comprised of numerous nodes providing numerous physical and logical paths for data to travel.

Each port unit 110 may be connected, via a specific communication link 195, to a corresponding port on a network device 192. In some circumstances, the port unit 110 may send more traffic to the corresponding port on the network device 192 than the network device 192 can properly receive. For example, the network device 192 may receive incoming packets from a plurality of sources at a total rate that is faster than the rate at which the network device 192 can process and forward the packets. In this case, buffer memories within the network device 192 may fill with received but unprocessed packets. To avoid losing packets due to buffer memory overflow, the network device 192 may send a flow control message or packet to the port unit 110.

For example, if the port unit 110 and the network device 192 communicate using a full-duplex Ethernet connection, IEEE Standard 802.3x provides that the network device 192 may send a pause frame or packet to the port unit 110. The pause frame may instruct the port unit 110 to stop sending packets, except for certain control packets, for a time period defined by data within the pause packet. The network device 192 may also send a pause packet defining a time period of zero to cause a previously-paused port unit to resume transmitting packets.

However, simply pausing the output from a port unit may not be an acceptable method of flow control in networks that prioritize traffic in accordance with quality of service (QoS) levels, traffic classes, or some other priority scheme. For example, IEEE Standard 802.1Qbb provides that a receiver may control the flow of eight traffic classes. To affect flow control, the receiver may send a priority flow control (PFC) packet to the transmitter instructing that any or all of eight traffic classes be paused. The PFC packet may also independently define a time period for which each traffic class should be paused.

Figure 2:
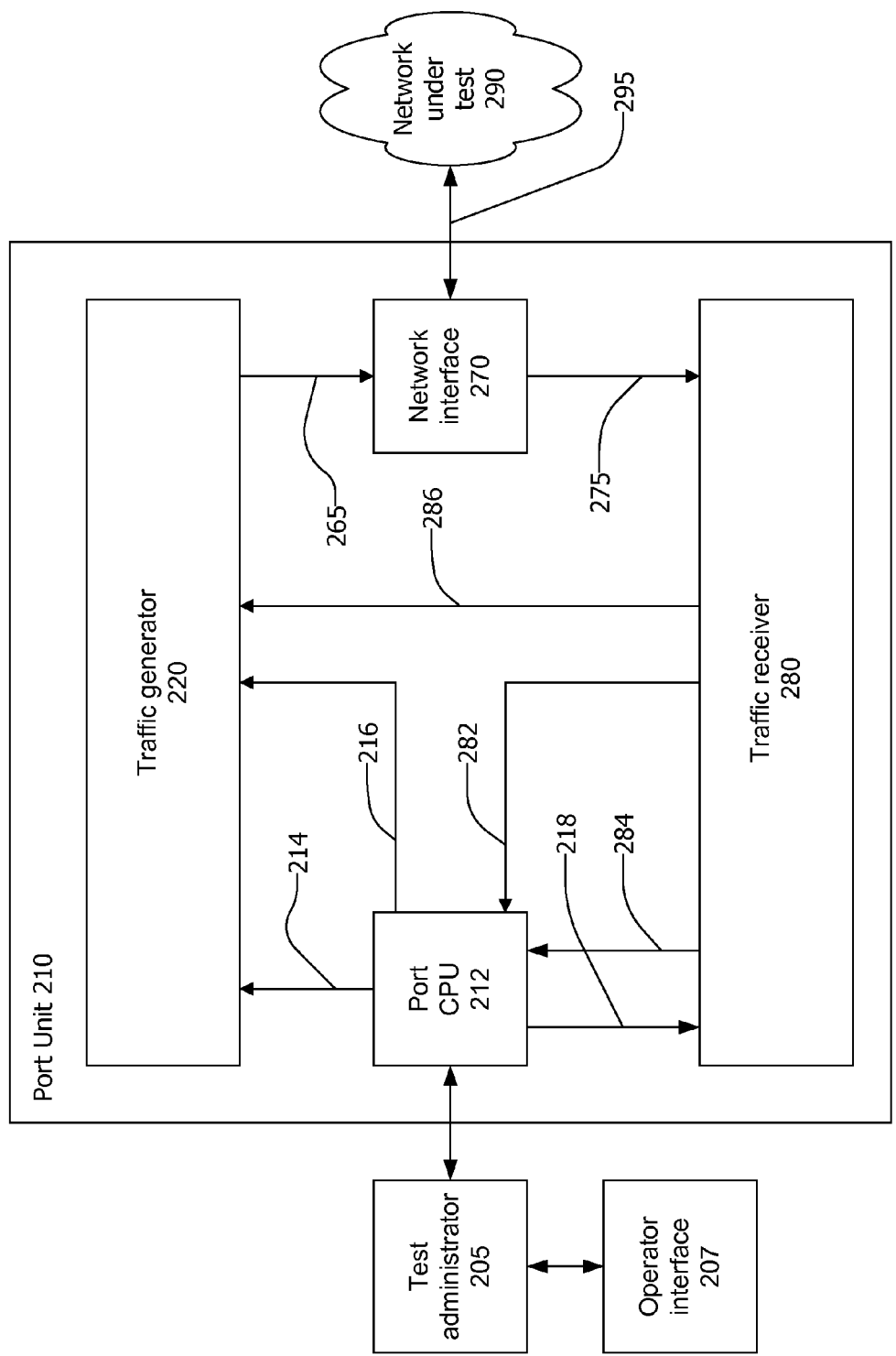
FIG. 2 is a block diagram of a port unit.

Referring now to FIG. 2, an exemplary port unit 210 may include a port central processor unit 212 (CPU), a traffic generator unit 220, a traffic receiver unit 280, and a network interface unit 270 which couples the port unit 210 to a network under test 290. The port unit 210 may be all or part of a network card such as the network cards 106.

The port CPU 212 may include a processor, a memory coupled to the processor, and various specialized units, circuits, software and interfaces for providing the functionality and features described here. The processes, functionality and features may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices.

The port CPU 212 may communicate with a test administrator 205, which in turn may communicate with or include an operator interface 207. The test administrator 205 may be a computing device contained within, or external to, the network test equipment 100. The test administrator 205 may provide the port CPU 212 with instructions and data required for the port unit to participate in testing the network 290. The instructions and data received from the test administrator 205 may include, for example, definitions of packet streams to be generated by the port unit 210 and definitions of performance statistics that may be accumulated and reported by the port unit 210.

The port CPU 212 may provide the traffic generator unit 220 with stream forming data 214 to form a plurality of streams. The stream forming data 214 may include, for example, the type of packet, the frequency of transmission, definitions of fixed and variable-content fields within the packet and other information for each packet stream. The traffic generator unit 220 may then generate the plurality of streams in accordance with the stream forming data 214. The plurality of streams may be interleaved to form outgoing traffic 265. Each of the streams may include a sequence of packets. The packets within each stream may be of the same general type but may vary in length and content.

The network interface unit 270 may convert the outgoing traffic 265 from the traffic generator unit 220 into the electrical, optical, or wireless signal format required to transmit the test traffic to the network under test 290 via a link 295, which may be a wire, an optical fiber, a wireless link, or other communication link. Similarly, the network interface unit 270 may receive electrical, optical, or wireless signals from the network over the link 295 and may convert the received signals into incoming traffic 275 in a format usable to the traffic receiver unit 280.

The traffic receiver unit 280 may receive the incoming traffic 275 from the network interface unit 270. The traffic receiver unit 280 may determine if each received packet is a member of a specific flow, and may accumulate test statistics for each flow in accordance with test instructions 218 provided by the port CPU 212. The accumulated test statistics may include, for example, a total number of received packets, a number of packets received out-of-sequence, a number of received packets with errors, a maximum, average, and minimum propagation delay, and other statistics for each flow. The traffic receiver unit 280 may also capture and store specific packets in accordance with capture criteria included in the test instructions 218. The traffic receiver unit 280 may provide test statistics and/or captured packets 284 to the port CPU 212, in accordance with the test instructions 218, for additional analysis during, or subsequent to, the test session.

Some amount of interactive communications may be required or desired between the port unit 210 and the network 290 during a test session. For example, the traffic receiver unit 280 may receive control packets, which are packets containing data necessary to control the test session, that require the port unit 210 to send an acknowledgement or response. The traffic receiver unit 280 may separate incoming control packets from the incoming traffic and may route the incoming control packets 282 to the port CPU 212. The port CPU 212 may extract the content of each control packet and may generate an appropriate response in the form of outgoing CPU traffic 216. Outgoing CPU traffic 216 may be provided to the traffic generator unit 220. The traffic generator unit 220 may insert the outgoing CPU traffic 216 into the outgoing traffic 265.

The outgoing traffic 265 from the traffic generator unit 220 may be divided into "flow control groups" which may be independently paused. For example, the outgoing traffic 265 may be divided into eight flow control groups that correspond to eight traffic classes in accordance with IEEE 802.1Qbb. The outgoing traffic 265 may be divided into eight flow control groups corresponding to eight traffic classes in accordance with IEEE 802.1Qbb and a ninth flow control group for control traffic and other traffic that may not be paused. Each stream generated by the traffic generator unit 220 may be assigned to a flow control group, and each flow control group may include none, one, or a plurality of streams. One form of control packet that may be received by the port unit 220 may be flow control packets, which may be, for example, in accordance with IEEE 802.3x or IEEE 802.1Qbb. Flow control packets may be recognized within the traffic receiver unit 280. Flow control packets and/or flow control data derived from flow control packets 286 may be provided directly from the traffic receiver unit 280 to the traffic generator unit 220.

The following description includes examples that assume flow control between a network test equipment port unit and a network device is managed using flow control packets according to IEEE 802.1Qbb. However, the described apparatus and methods are compatible with other present or future prioritized flow control schemes, including more or fewer than eight traffic classes.

Figure 3:
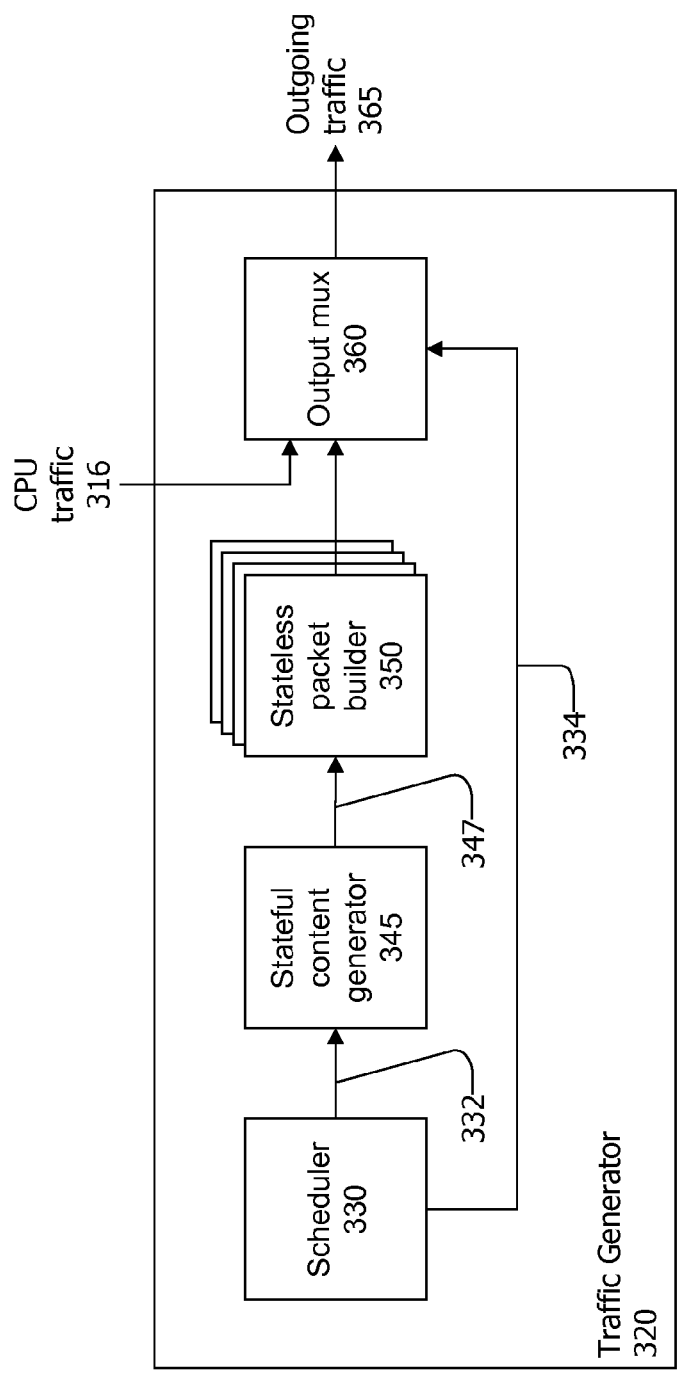
FIG. 3 is a block diagram of a traffic generator.

Referring now to FIG. 3, an exemplary traffic generator 320 may generate outgoing traffic 365 composed of a plurality of streams of packets. The traffic generator may be capable of generating, for example, 16 streams, 64 streams, 256 streams, 512 streams, or some other number streams which may be interleaved in any combination to provide the test traffic. The exemplary traffic generator 320 may be the traffic generator unit 220 of FIG. 2 and may be all or a portion of a network card 106 as shown in FIG. 1.

The traffic generator 320 may include a scheduler 330. A desired transmission rate may be associated with each of the plurality of streams to be generated by the traffic generator 320. The scheduler 330 may include a timing mechanism such as a counter or virtual counter for each stream to indicate when each stream should contribute a packet to the outgoing traffic 365. The scheduler 330 may also include arbitration logic to determine the packet sequence in situations when two or more streams attempt to contribute packets at the same time. The scheduler 330 may be implemented in hardware or a combination of hardware and software. For example, U.S. Pat. No. 7,616,568 B2 describes a scheduler using linked data structures and a single hardware timer. Published Application No. US 2011/0002228 A1 describes a scheduler using a plurality of hardware timers.

For each packet to be generated, the scheduler 330 may output packet definition data 332. The packet definition data 332 may include data necessary to define a packet to be generated, but not necessarily all data required to generate the packet. Each packet to be generated will belong to one of the plurality of streams and the packet definition data 332 may include, for example, a stream identifier identifying the corresponding stream. The packet definition data 332 may include data identifying a type, length, or other characteristic of a packet to be formed.

Each packet to be generated by the traffic generator 320 may include both stateful content and stateless content. "Stateful content" is content that depends on the content of prior packets in the same stream. Examples of stateful content include a sequential sequence number assigned to packets within a stream and an address or other field within the packet that is derived by adding an offset to the content of the same field within the previous packet. Such content is considered "stateful" because the traffic generator must maintain a history or "state" for each stateful content item. In contrast "stateless content" is content that does not depend on the content of prior packets. Examples of stateless content include randomly-generated payload content, fixed content that does not vary between packets in a stream, and checksums generated based on the present content of a packet. "Stateful content" and "stateless content" should not be confused with stateful connections and stateless connections via a network.

The traffic generator 320 may include a stateful content generator 345. The stateful content generator 345 may generate stateful content 347 associated with the packet definition data 332 output from the scheduler 330. The combination of the packet definition data 332 and the associated stateful content will be referred to herein as "packet forming data" 347.

Packet forming data 347 may be provided to a stateless packet builder 350. The stateless packet builder 350 may complete the generation of each packet based on the corresponding packet forming data 347. For each packet, the stateless packet builder 350 may retrieve a packet template in accordance with the stream identifier included in the packet forming data. The packet template may contain fixed data that does not vary between packets in a stream. The stateless packet builder may then insert stateful content from the packet forming data into appropriate fields within the template, generate payload content and other stateless content, generate and place checksums within the packet, and perform other tasks required to complete each packet.

It may be impractical for a single stateless packet builder to build sufficient packets to test a modern high speed network at line rate. Thus a stateless packet builder may include a plurality of parallel lanes. Each lane may have the capacity to independently build packets. The presence of multiple lanes may increase the speed at which packet can be created roughly in proportion to the number of lanes. FIG. 3 illustrates the stateless packet builder 350 having four lanes. However, a stateless packet builder may have more or fewer than four lanes.

Packets built by the stateless packet builder 350 may be delivered to an output multiplexer 360. The output multiplexer 360 may form the outgoing traffic 365 by interleaving packets from the channels of the stateless packet builder 350 and CPU traffic 316. The output multiplexer may also perform finishing operations on packets prior to transmission, such as adding a timestamp indicating a transmission time of each packet and adding or adjusting a cyclic redundancy check value.

To ensure that packets from the lanes of the stateless packet builder 350 are interleaved in a desired order, the output multiplexer 360 may receive packet sequence data 334 from the scheduler 330. The packet sequence data 334 may indicate a required order of transmission for the outgoing traffic. U.S. Pat. No. 7,769,049 B2, entitled Traffic Generator Using Parallel Coherent Transmit Engines, describes a multi-lane traffic generator that interleaves packets from multiple transmit engines (stateless packet builders) in accordance with packet sequence data provided by a scheduler.

Each lane of the stateless packet builder 350 may be configured as pipeline including a plurality of sequential stages, such that more than one packet may be in process within the stateless packet builder at any point in time. The stateless packet builder may include internal FIFO (first-in, first-out) queues to hold packet between or within processing stages. The delay from the time when packet forming data for a specific packet is input to the stateless packet builder until the time when the completed packet is output from the stateless packet builder may depend on the length and/or content of the specific packet and the length and/or content of packets that preceded the specific packet in the pipeline.

Implementing priority flow control in accordance with IEEE 802.1Qbb requires a capability to pause transmission of packets within one or more designated flow control groups while the transmission of packets of other flow control groups continues uninterrupted. Simply inhibiting the scheduling of packets in the paused flow control groups may not be sufficient, since transmission of packets in the paused flow control groups may continue for an appreciable time period as packets in the stateless packet builder pipeline are completed and transmitted. A more immediate response to flow control commands may be achieved if in-process packets of paused flow control groups can be halted within the stateless packet builder. In this case, however, packets of non-paused flow control groups must be able to pass halted packets along the stateless packet builder pipeline.

Copending patent application Ser. No. 12/766,704, entitled Traffic Generator With Priority Flow Control, describes a traffic generator in which internal FIFO queues of a packet generator (stateless packet builder) are channelized. In this description, the term "channelized" means "having a plurality of parallel channels, with each channel uniquely associated with a corresponding one of a plurality of flow control groups". The term "uniquely associated" means a one-to-one correspondence. Each channel of a channelized FIFO queue may be dedicated to storing in-process data and packets for the corresponding flow control group. Each channelized FIFO queue provides an opportunity for packets of non-paused traffic classes to pass halted packets within the traffic generator.

Implementing priority flow control in a high speed traffic generator using a multi-lane stateless packet builder may require an impractical amount of memory devoted to channelized queues. For example, with the approach described in patent application Ser. No. 12/766,704, a traffic generator with four stateless packet builder lanes and nine flow control groups would require FIFO queues with 36 channels (9 channels in each of four lanes). This large number of parallel FIFO queues may be impractical, particularly when a traffic generator is implemented using field programmable gate arrays or other programmable circuit devices.

Figure 4:
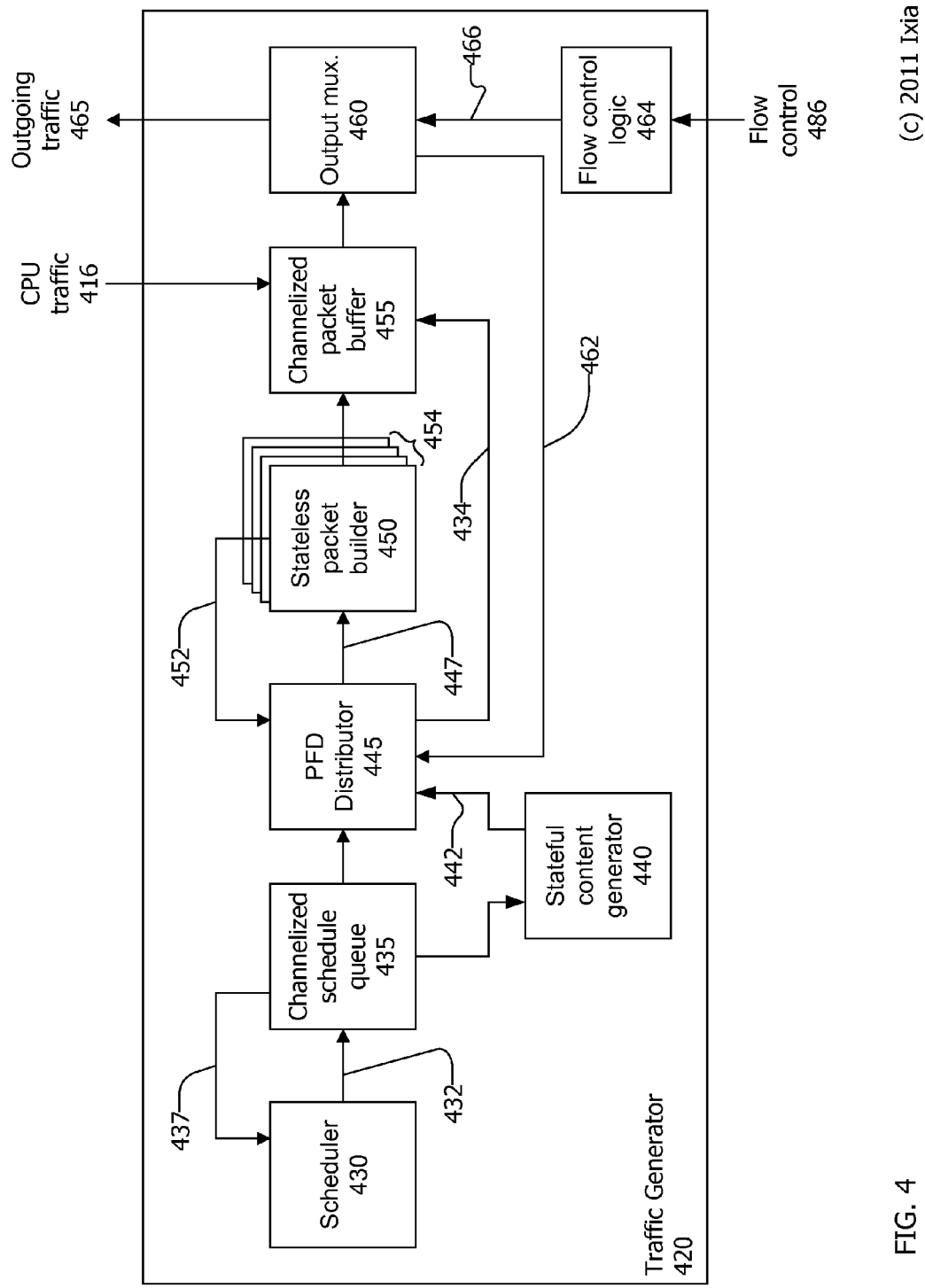
FIG. 4 is a block diagram of a multi-lane traffic generator with priority flow control.

Referring now to FIG. 4, an exemplary traffic generator 420 may generate outgoing traffic at very high line rates and provide multi-level priority flow control. The traffic generator 420 may include a scheduler 430, a stateful content generator 440, a multi-lane stateless packet builder 450, and an output multiplexer 460 that function generally as described for the counterpart elements of the traffic generator 320 of FIG. 3. The traffic generator 420 may also include a channelized schedule FIFO 435 to store packet definition data provided by the scheduler 430 and a channelized packet buffer 455 to store completed packets provided by the stateless packet builder 450.

The scheduler 430 may schedule a plurality of streams, such as 16 streams, 64 streams, 256 streams, 512 streams, or some other number streams. The scheduler 430 may include a timing mechanism such as a counter or virtual counter for each stream to indicate when each stream should contribute a packet to the outgoing traffic 465. The scheduler 430 may also include arbitration logic to determine the packet sequence in situations when two or more streams attempt to contribute packets at the same time.

For each packet to be generated, the scheduler 430 may output packet definition data 432. The packet definition data 432 may include data necessary to define a packet to be generated, but not necessarily all data required to generate the packet. Each packet to be generated will belong to one of the plurality of streams and the packet definition data 432 may include, for example, a stream identifier identifying the corresponding stream. Each stream, and thus each packet and each item of packet definition data, may be associated with one of a plurality of flow control groups. For example, each stream may be associated with one of nine flow control groups including eight flow control groups corresponding to eight traffic classes in accordance with IEEE 802.1Qbb and a ninth flow control group for control traffic and other traffic that may not be paused. The packet definition data 432 may include a flow control group identifier identifying a flow control group associated with each packet.

The associations between steams and flow control groups may be fixed or programmable. For example, the scheduler 430 may include a map memory (not shown) that stores data mapping each stream identifier to the associated flow control group. The data mapping each stream identifier to the associated flow control group may be loaded into the map memory prior to a test session and may be modifiable during a test session.

The channelized schedule queue 435 may store packet definition data 432 output from the scheduler 430. Each channel of the channelized schedule queue 435 may operate in a first-in first-out manner. Each channel of the channelized schedule queue 435 may be dedicated to storing packet definition data for the associated flow control group. The channelized schedule queue 435 may provide feedback 437 to the scheduler 430 indicating if one or more channels of the channelized schedule queue is full. The scheduler 430 may suspend scheduling packet streams associated with the one or more full channels of the channelized schedule queue 435.

A PFD (packet forming data) distributor 445 may combine packet definition data 432 read from the channelized schedule queue 435 with stateful content 442 from the stateful content generator 440 to create packet forming data 447. The PFD distributor 445 may transfer the packet forming data for each packet to one of the lanes of the stateless packet builder 450. The operation of the PFD distributor 445 will be discussed in additional detail subsequently.

The stateless packet builder 450 may complete the generation of each packet based on the corresponding packet forming data as previously described. The stateless packet builder 450 may include a plurality of non-channelized parallel lanes 454. In this patent, "non-channelized" means without channels. Specifically, the internal queues within a non-channelized packet builder do not have parallel paths to enable one packet to pass another in the pipeline. Thus, once started, each packet must travel through all of the sequential stages of the stateless packet builder pipeline and exit the lane before any subsequent packet in the lane can be completed.

The stateless packet builder 450 may provide lane output feedback 452 to the PFD distributor 445. The lane output feedback 452 may indicate that the stateless packet builder 450 has transferred a completed packet to the channelized packet buffer 455. The lane output feedback 452 may include a length of the completed packet and a lane identifier.

Completed packets output from the stateless packet builder 450 may be stored in the channelized packet buffer 455. Each channel of the channelized packet buffer 455 may include a block of memory and logic to control writing packets into and reading packets from the memory. Each channel of the channelized packet buffer 455 may be dedicated to storing completed packets for the associated flow control group.

Since some flow control groups may be paused while transmission of packets from other flow control groups continues, the relative order of packets between flow control groups cannot be guaranteed. The order of packets within each flow control group may be preserved, which is to say the order the packets are incorporated into the outgoing traffic 465 may be the same as the order in which they were scheduled. To this end, the channelized packet buffer 455 may receive packet sequence data 434 from the PFD distributor 445. Logic within the channelized packet buffer 455 may use the packet sequence data to store completed packets in the scheduled order within each channel.

The channelized packet buffer 455 may not operate as a conventional first-in first-out queue. For example, presume packet A and packet B belong to the same flow control group and are scheduled to be transmitted in the order "A followed by B". Packet A is assigned to a first lane of the stateless packet builder and packet B is assigned to a second lane of the stateless packet builder. If the packet B is substantially shorter than packet A, packet B may be completed and stored in the channelized packet buffer 455 prior to packet A. In this situation, the first-in packet (packet B) is not intended to be the first-out packet.

An output multiplexer 460 may interleave packets from the channels of the channelized packet buffer 455 to form the outgoing traffic 465. The output multiplexer 460 may use any of a variety of known techniques for selecting the order in which packets are added to the outgoing traffic 465. For example, the output multiplexer 460 may use a round robin technique to retrieve packets, when available, from each channel in sequential order. The output multiplexer 460 may select packets based on the number of packets stored in each channel or based on predetermined priorities assigned to the channels. The output multiplexer 460 may select packet based on a fair access algorithm or in some other manner.

The output multiplexer may receive flow control data 466 from flow control logic 464. The flow control data 466 may indicate whether or not each of a plurality of flow control groups, corresponding to the plurality of channels in the channelized packet buffer 455 and the channelized schedule queue 435, is paused. When a flow control group is paused, the output multiplexer 460 may discontinue reading packets from the associated channel of the channelized packet buffer. The flow control logic 464 may receive and decode flow control packets 486 to provide the flow control data 466.

The output multiplexer 460 may provide channel output feedback 462 to the PFD distributor 445. The channel output feedback 462 may indicate that the output multiplexer 460 has pulled a packet from one of the channels of the channelized packet buffer 455. The channel output feedback 462 may include a length of the pulled packet and a channel identifier.

Figure 5:
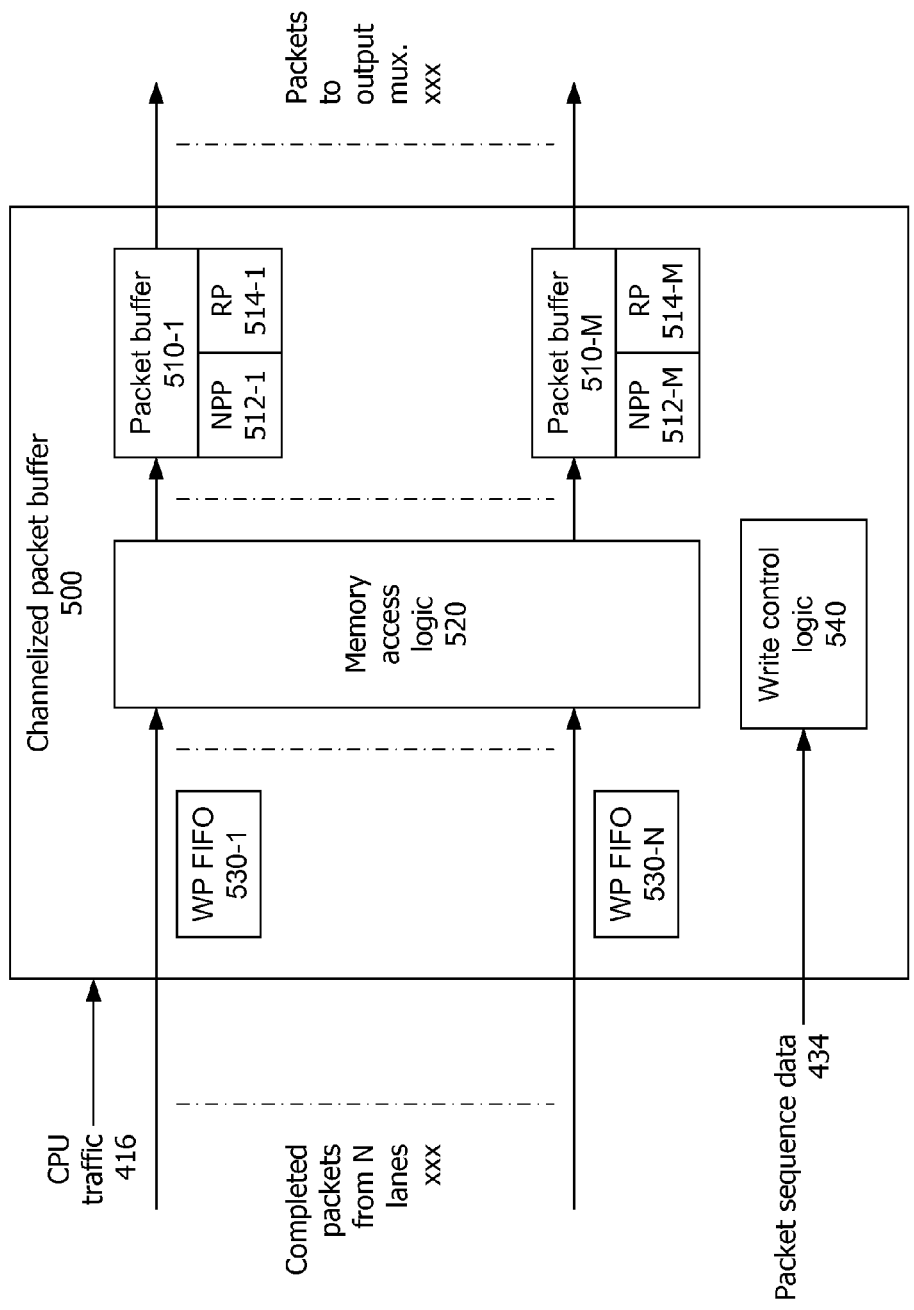
FIG. 5 is a block diagram of a channelized packet buffer.

FIG. 5 shows a block diagram of a channelized packet buffer 500 which may be suitable for use as the channelized packet buffer 455 in the traffic generator 420. The channelized packet buffer 500 is exemplary and other implementations of a channelized packet buffer are possible. The channelized packet buffer 500 may receive completed packets from N lanes of a stateless packet builder, such as the stateless packet builder 450, and store each completed packet in one of M packet buffer memories (of which only packet buffer 510-1 and packet buffer 510-M are shown), where N and M are integers greater than one. Continuing previous examples, N may be four and M may be nine. Completed packets may be transferred from the N lanes to the M packet buffers via memory access logic 520. The memory access logic 520 may allow packets from any lane to be written into any of the packet buffers, and may allow packets from two or more lanes to be written in respective packet buffers simultaneously. The memory access logic 520 may function generally as a cross bar switch, although the implementation of the memory access logic 520 may not be a physical cross bar matrix.

Each packet buffer 510-1 to 510-M may be a block of random access memory used as a circular buffer, which is to say that after data is read from or written into the highest address within the memory block, the subsequent data item is read form or written into the lowest address within the memory block. The locations where data is read from and written into each packet buffer 510-1 to 510-M may be controlled by respective read pointers and write pointers.

The channelized packet buffer may include a read pointer (RP) 514-1 to 514-M uniquely associated with each packet buffer 510-1 to 510-M. Each read pointer 514-1 to 514-M may indicate that address within the respective packet buffer that will be read next when a packet is pulled from the output buffer by an output multiplexer such as the output multiplexer 460. The channelized packet buffer 500 may include a write pointer first-in first-out queue (WP FIFO) associated with each lane of the stateless builder, of which only WP FIFO queues 530-1 and 530-N are shown. Each entry in a WP FIFO may indicate the starting addresses at which a corresponding packet output from the associated stateless packet builder channel will be stored. The channelized packet buffer may also include a next packet pointer (NPP) 512-1 to 512-M uniquely associated with each packet buffer 510-1 to 510-M. Each NPP may store the lowest address in the associated packet buffer that does not presently store a packet and has not been committed to storing a packet that is in-process within any of the stateless packet builder lanes.

Write control logic 540 may generate the write pointers placed in the WP FIFOs 530-1 to 530-N and update the values of the NPPs 512-1 to 512-M based on packet sequence data 434 received from a PFD distributor such as the PFD distributor 445. The packet sequence data 434 may be sent from the PFD distributor to the write control logic 540 every time the PFD distributor assigns a packet to one of the lanes of the stateless packet builder 450. The PFD for each packet may include a lane identifier, a flow control group/packet buffer identifier, and a packet length. The write control logic 540 may use this data to add a write pointer to the WP FIFO 530-1 to 530-N associated with the identified stateless packet builder lane, and to recalculate the NPP 512-1 to 512-M associated with the identified packet buffer.

Continuing the previous example, assume that packets A and B belong to the flow control group associated with packet buffer 510-1. When the PFD distributor assigns packet A to a first lane of the stateless packet builder 450, the PFD distributor also sends packet sequence data associated with packet A to the write control logic 540. The write control logic 540 then copies the NPP 512-1 for the packet buffer 510-1 to the back of the WP FIFO associated with the first lane and adds the length of packet A to the previous NPP 512-1 value to calculate a new NPP for packet buffer 510-1. Adding the length of packet A to the NPP value reflects the commitment of a portion of packet buffer 510-1 to store packet A when packet A is delivered by the first lane of the stateless packet builder. Similarly, when the PFD distributor assigns packet B to a second lane of the stateless packet builder, the PDF distributor also sends packet sequence data associated with packet B to the write control logic 540. The write control logic then copies the new value of NPP 512-1 to the back of the WP FIFO associated with the second lane and adds the length of packet B to the previous value of NPP 512-1. Thus packets received from the stateless packet builder lanes are stored in the order in which the packets were scheduled, which is not necessarily the order in which the packets were received at the channelized packet buffer.

Figure 6:
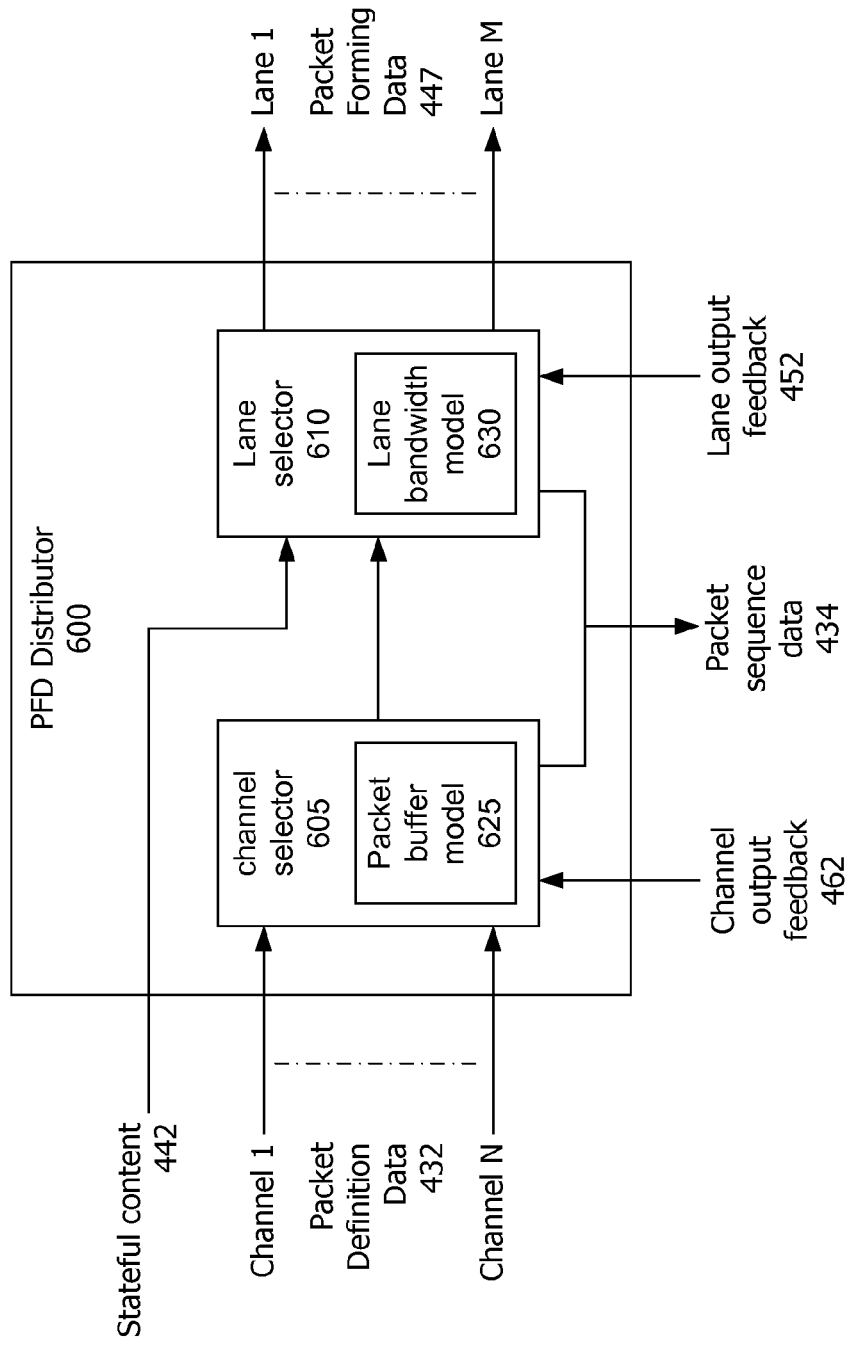
FIG. 6 is a block diagram of a packet forming data (PFD) distributor.

FIG. 6 shows a block diagram of a PFD distributor 600 that may be suitable for use as the PFD distributor 445 in the traffic generator 420. The PFD distributor 600 is exemplary and other implementations of a PFD distributor are possible. The PFD distributor 600 may receive packet definition data from N lanes of a channelized schedule queue such as the channelized schedule queue 435. The PFD distributor 600 may send packet forming data 447 to M lanes of a stateless packet builder such as the stateless packet builder 450. Continuing the previous examples, N may be equal to nine and M may be equal to four. The packet forming data 447 may include packet definition data and associated stateful content 442. The PFD distributor 600 may include a channel selector 605 and a lane selector 610.

The channel selector 605 may pull packet definition data 432 from the N channels of the channelized schedule queue. The channel selector 605 may use any of a variety of known techniques for selecting the order in which packet definition data is read from the channels of the channelized schedule queue. For example, the channel selector 605 may use a round robin technique to retrieve packet definition data, when available, from each channel in sequential order. The channel selector 605 may select channels based on the number of data items stored in each channel of the channelized schedule queue, or based on predetermined priorities assigned to the channels. The channel selector 605 may select channels based on a fair access algorithm or in some other manner.

As previously described, the PFD distributor 600 may provide packet forming data to a multi-lane non-channelized stateless packet builder. Since a non-channelized packet builder does not allow in-process packets to pass each other within a lane, each packet assigned to a given lane must be completed and transferred to a destination channel of a channelized packet buffer, such as the channelized packet buffer 455, before any subsequent packet can be completed in the same lane. To avoid blocking one or more lanes of the stateless packet builder, the PFD distributor may send packet forming data 447 to the stateless packet builder only if the destination channel of the channelized packet buffer has sufficient uncommitted space in which to store the packet once it is completed.

The channel selector 605 may maintain a packet buffer model 625. The packet buffer model may indicate the current uncommitted capacity of each channel of the channelized packet buffer. To this end, the channel selector 625 may receive channel output feedback indicating the lengths of packet read from each channel of the channelized packet buffer. The uncommitted capacity of each channel is the memory capacity that (a) is not currently used to store one or more completed packets and (b) has not been allocated for storing packets currently in-process within the stateless packet builder. Thus the uncommitted capacity of each channel indicates the memory capacity that would remain if the flow control group associated with the channel is paused and all in-process packets are completed by the stateless packet builder. The channel selector may model the uncommitted capacity of each packet buffer channel using the formula:

$$\text{(uncommitted capacity)} = \text{(memory size)} - \text{(total length of packets assigned to packet builder)} + \text{(total length of packets read from packet buffer)}. \quad (1)$$

The PFD distributor 600 may include a lane selector to select one of M lanes of the stateless packet builder to receive the packet forming data 447 for each packet to be built. The lane selector may select the lane using a load sharing algorithm. For example, the lane selector may maintain a lane bandwidth model 630 indicating the available capacity of each lane of the stateless packet generator. The lane bandwidth model may track the cumulative total length of packets assigned to each lane, the total length of the packets current in process in each lane, or some other measure of lane bandwidth. To this end, the lane selector may received lane output feedback 452 indicating when each lane forwards a completed packet to the channelized packet buffer. The lane selector may send each new item of packet forming data to the lane having the most available bandwidth.

Description of Processes

Figure 7:
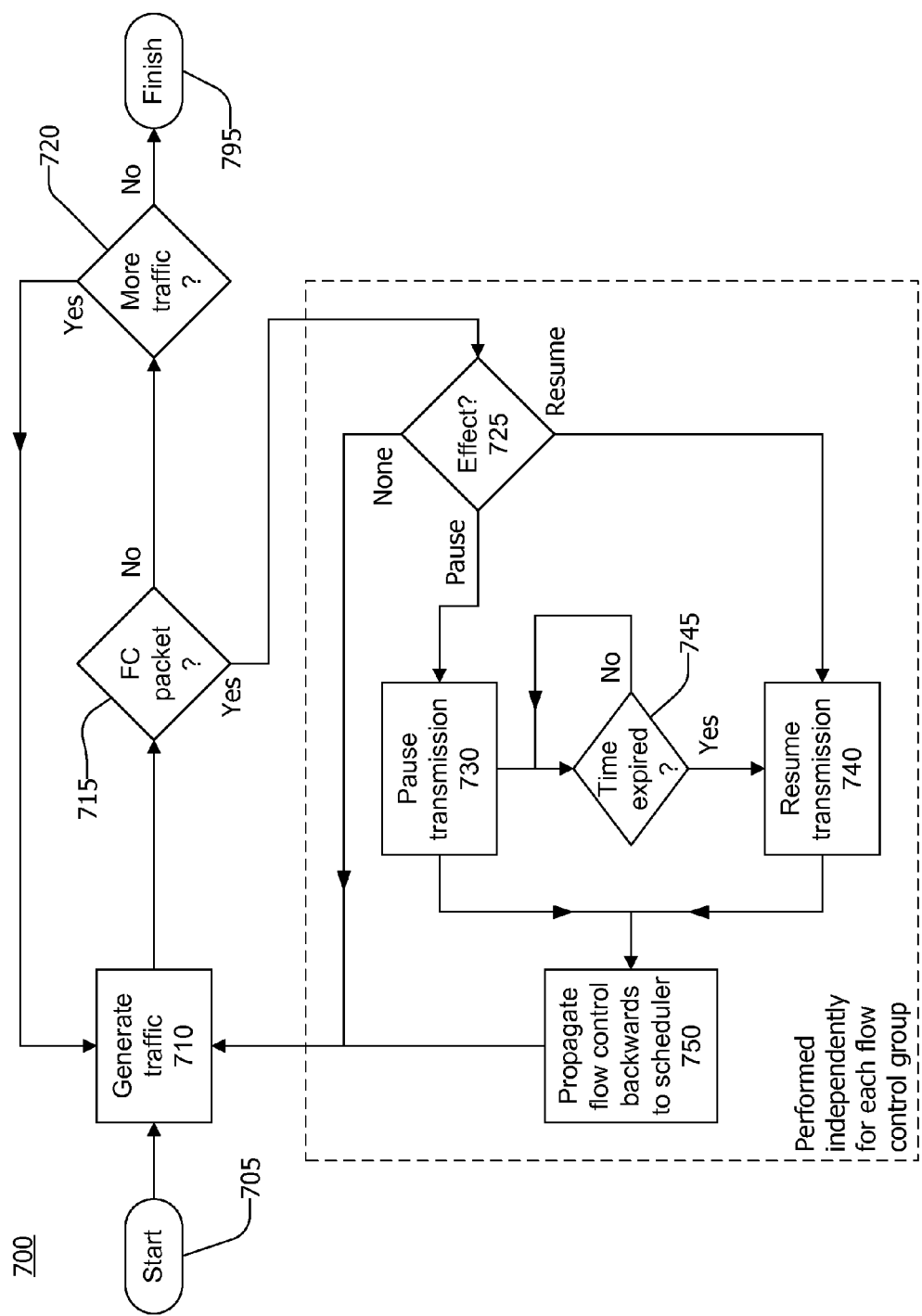
FIG. 7 is a flow chart of flow control logic in a traffic generator.

Referring now to FIG. 7, a process 700 for generating traffic may start at 705 and may end at 795 after a large number of packets have been generated, or when stopped by an operator action (not shown in FIG. 7). The process 700 may be appropriate for generating traffic using a traffic generator, such as the traffic generator 320 or the traffic generator 420. The process 700 may be cyclic and real-time in nature. The flow chart of FIG. 7 shows the process 700 as performed by a single port unit. It should be understood that the process 700 may be performed simultaneously by a plurality of port units in parallel during a test session.

Prior to the start of the process 700 at 705, a test session may have been designed. The test session design may be done, for example, by a test administrator computing device, such as the test administrator 205, coupled to one or more port units, such as the port unit 210. Designing the test session may include determining or defining the architecture of the network or network equipment, defining streams to be generated by each port unit during the test session, creating corresponding stream forming data, and forwarding respective stream forming data to at least one port unit. Designing the test session may also include defining a plurality of flow control groups (FCGs) and associating each stream with one FCG. FCG map data defining the associations between streams and FCGs may be provided to each port unit. For example, the FCG map data may be written into an FCG map memory, such as the memory 424, within each port unit.

At 710, the traffic generator may generate traffic by forming and transmitting a packet. At 715, a determination may be made whether or not a flow control (FC) packet has been received. When a flow control packet has not been received, a determination may be made at 720 whether or not there are more packets to be generated. If there are no more packets to be generated, the test session may finish at 795. When there are more packets to be generated, the process may repeat from 710. Although the actions at 710, 715, and 720 are shown to be sequential for ease of explanation, these actions may be performed concurrently. The actions from 710 to 720 may be repeated essentially continuously for the duration of a test session.

When a determination is made at 715 that a flow control packet has been received, the actions from 725 to 750 may be performed independently and concurrently for each of a plurality of flow control groups. At 725, a determination may be made if the received flow control packet contains instructions that affect a specific flow control group. For example, the flow control packet may contain an N-bit mask, where N is the number of flow control groups, indicating whether or not each flow control group is affected by the packet. The flow control packet may contain additional data indicating if transmission of each affected flow control group should be paused or resumed. The flow control packet may also contain information indicating a pause duration for each flow control group to be paused.

For example, a priority flow control packet in accordance with IEEE 802.1(Qbb) contains an eight-bit mask, where a bit value of 0 indicates the packet does not affect the status of a respective flow control group and a bit value of 1 indicates that the packet instructs that the respective flow control group be paused. A priority flow control packet also contains a pause duration for each flow control group to be paused, where a pause duration of zero indicates that a previously paused flow control group should be resumed.

At 725, a determination may be made that a received flow control packet contains instructions to pause a specific flow control group, to resume transmission of the specific flow control group, or has no effect (none) on the specific flow control group. When the received flow control packet has no effect on the specific flow control group, the process 700 returns to 710.

When a determination is made at 725 that the received flow control packet contains instructions to pause a specific flow control group, the packet generator may suspend transmission of packets associated with the paused flow control group at 730. For example, at 730, flow control data indicating that the flow control group has been paused may be sent to an output multiplexer such as the output multiplexer 460. At 750, the flow control data may propagate backwards (in the reverse direction of the flow of packet forming data) up the pipeline to cause the traffic generator to stop generating packets for the paused flow control group in an orderly manner, such that no packets are dropped within the traffic generator and such that the transmission of packets may be resumed without waiting for the pipeline to refill.

When the received flow control packet contains instructions to pause a flow control group for a specified time interval, a timer may be started to track the time remaining in the specified time interval. When a determination is made at 745 that the specified time interval has elapsed, the packet generator may automatically resume transmission of packets associated with the paused flow control group at 740. For example, at 740, flow control data indicating that the flow control group is not paused may be supplied to the output multiplexer. The flow control data may then propagate backwards up the pipeline at 750.

When a determination is made at 725 that the received flow control packet contains instructions to resume transmission of a flow control group, the packet generator may resume transmission of packets associated with the paused flow control group at 740. For example, at 740, flow control data indicating that the flow control group is not paused may be supplied to the output multiplexer. The flow control data may then propagate backwards up the pipeline at 750.

Figure 8:
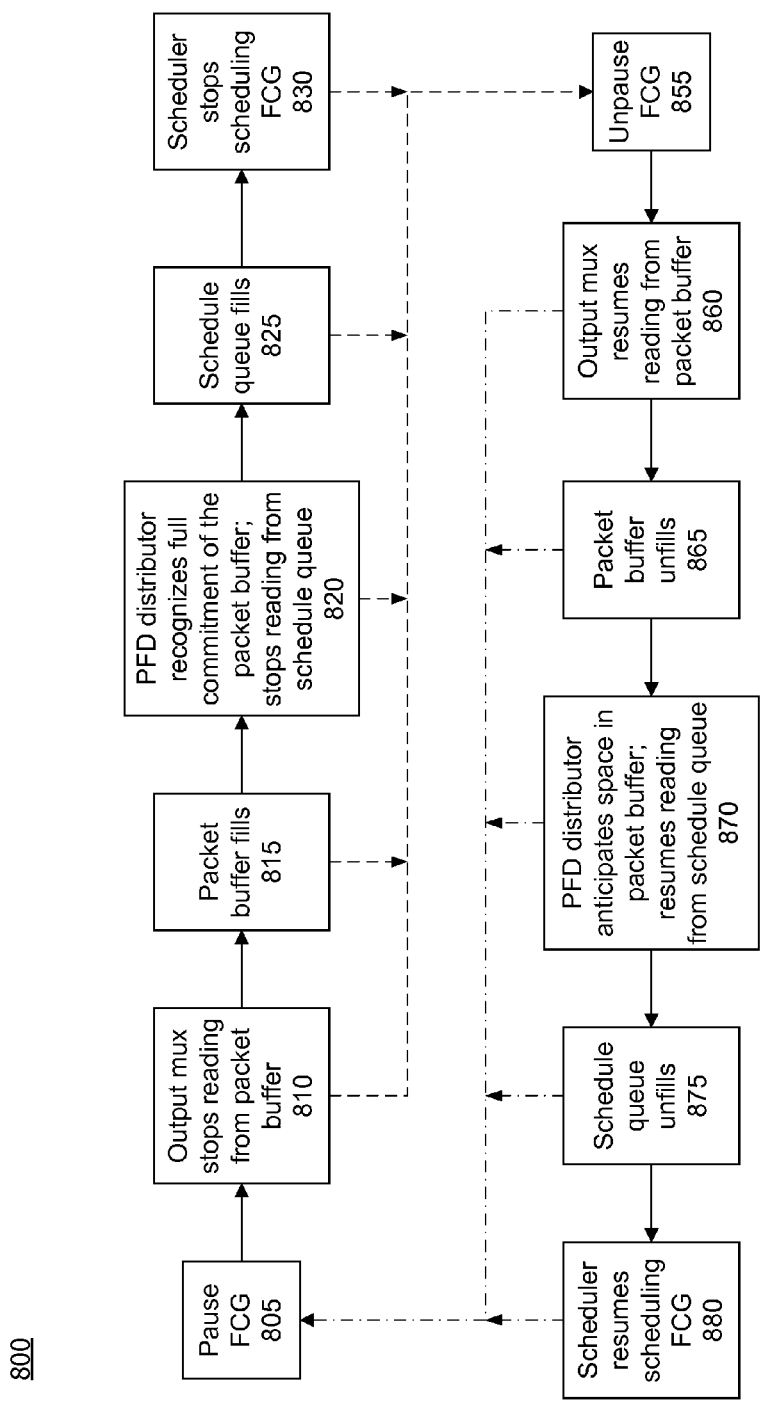
FIG. 8 is a graphical representation of flow control within a traffic generator.

FIG. 8 shows a flow chart of an exemplary process 800 for flow control of a single specific flow control group within a traffic generator. The process 800 may not start or end at any specific point, but may repeated cyclically each time the flow control of the flow control group changes. The process 800 may be performed by a traffic generator, such as the traffic generator 400, including a scheduler, a channelized schedule queue, a PFD distributor, a packet builder, a channelized packet buffer, and an output multiplexer. It should be understood that the process 800 may be performed simultaneously by a plurality of port units in parallel during a test session, and that each port unit may perform the process 800 simultaneously and independently for a plurality of flow control groups.

For purpose of discussion assume the process 800 starts at 805 when the flow control group is paused. The flow control group may be paused, for example, in response to a flow control packet received by the traffic generator. After the flow control group is paused, at 810, the output multiplexer may stop reading packets for the paused flow control group from the corresponding channel of the channelized packet buffer, causing the channel to fill at 815.

The PFD distributor may continue to send the packet builder packet forming data for packets in the paused flow control group until the PFD distributor recognizes, at 820, that the capacity of the associated packet buffer has been fully committed (i.e. the uncommitted capacity is insufficient to hold another packet). Once the PFD distributor recognizes that the packet buffer cannot hold another packet, the PFD distributor may stop reading from the schedule queue channel associated with the paused flow control group.

After the PFD distributor stops reading from the schedule queue channel, the schedule queue channel will become full at 825. In response, at 830, the scheduler may stop scheduling the paused flow control group, which is to say that the scheduler may stop outputting packet definition data for packets in the paused flow control group.

At 855, the previously paused flow control group may be unpaused. The flow control group may be unpaused, for example, in response to a flow control packet received by the traffic generator. After the flow control group is unpaused, at 860, the output multiplexer may resume reading packets for the paused flow control group from the corresponding channel of the channelized packet buffer, causing the packet buffer channel to unfill (i.e. become less than fully committed) at 865.

At 870, the PFD distributor may recognize that the capacity of the associated packet buffer channel is no longer fully committed. For example, the PFD distributor may receive feedback from the output multiplexer indicating that one or more packets have been read from the packet buffer channel. Once the PFD distributor recognizes that the packet buffer channel can hold another packet, the PFD distributor may resume reading from the schedule queue channel associated with the paused flow control group.

After the PFD distributor resumes reading from the schedule queue channel, the schedule queue channel will become less than full at 875. In response, at 880, the scheduler may resume scheduling the paused flow control group, which is to say that the scheduler may resume outputting packet definition data for packets in the paused flow control group.

As indicated by the dashed lines, a paused flow control group may be unpaused at any point in the flow from 810 to 830, in which case some of the actions from 810 to 830 may not occur. Similarly, as indicated by the dash-dot lines, an un-paused flow control group may be paused at any point in the flow from 860 to 880, in which case some of the actions from 860 to 880 may not occur.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An apparatus to generate test traffic for testing a network, comprising:
   a scheduler to provide packet definition data for a sequence of packets to be built, each packet uniquely associated with a respective flow control group from a plurality of flow control groups;
   a channelized schedule queue to store the packet definition data, the channelized schedule queue including a plurality of parallel channels, each channel dedicated to storing packet definition data associated with a corresponding one of the plurality of flow control groups;
a distributor configured to combine packet definition data read from the channels of the channelized schedule queue with stateful packet content to create packet forming data;
a plurality of non-channelized packet builder lanes to independently build packets in accordance with the packet forming data provided by the distributor, each lane configured as a pipeline, wherein each packet must travel through all sequential stages of the pipeline and exit the lane before any subsequent packet in the lane can be completed;
a channelized packet buffer to store packets built by the plurality of non-channelized packet builder lanes, the channelized packet buffer including a plurality of parallel channels, each channel dedicated to storing packets associated with a corresponding one of the plurality of flow control groups; and
an output multiplexor to interleave packets from the channels of the channelized packet buffer to provide the test traffic.

2. The apparatus of claim 1, further comprising:
flow control logic configured to selectively pause and unpause one or more of the flow control groups in response to received flow control packets, wherein
the output multiplexor discontinues reading packets from channels of the channelized packet buffer associated with paused flow control groups.

3. The apparatus of claim 1, wherein
the distributor comprises a model to predict a capacity of each channel of the channelized packet buffer, and
the distributor routes each item of packet forming data to a selected non-channelized packet builder lane only if the predicted capacity of the corresponding channel of the channelized packet buffer is sufficient to hold the packet defined by the packet forming data.

4. The apparatus of claim 1, wherein
the channelized packet buffer is configured to store packets in each channel in accordance with packet sequence data provided by the distributor.

5. The apparatus of claim 1, wherein
the channelized schedule queue is configured to inform the scheduler when one more channels are full, and
the scheduler is configured to discontinue scheduling flow control groups associated with full channels.

6. A method for generating test traffic to test a network, comprising:
generating packet definition data for a sequence of packets to be built, each packet uniquely associated with a respective flow control group from a plurality of flow control groups;
storing the packet definition data in a channelized schedule queue, the channelized schedule queue including a plurality of parallel channels, each channel dedicated to storing packet definition data associated with a corresponding one of the plurality of flow control groups;
a distributor combining packet definition data read from the channels of the channelized schedule queue with stateful packet content to create packet forming data;
a plurality of non-channelized packet builder lanes independently building packets in accordance with the packet forming data, each packet builder lane configured as a pipeline, wherein each packet must travel through all sequential stages of the pipeline and exit the lane before any subsequent packet in the lane can be completed;
storing built packets in a channelized packet buffer, the channelized packet buffer including a plurality of parallel channels, each channel dedicated to storing packets associated with a corresponding one of the plurality of flow control groups; and
interleaving packets read from the channels of the channelized packet buffer to provide the test traffic.

7. The method of claim 6, further comprising:
receiving flow control packets;
selectively pausing and unpausing one or more flow control groups in response to the received flow control packets; and
discontinuing reading packets from channels of the channelized packet buffer associated with paused flow control groups.

8. The method of claim 6, further comprising:
the distributor maintaining a model to predict a capacity of each channel of the channelized packet buffer; and
the distributor routing each item of packet definition data to a selected non-channelized packet builder lane only if a predicted capacity of the corresponding channel of the channelized packet buffer is sufficient to hold the packet defined by the packet definition data.

9. The method of claim 6, further comprising:
storing the built packets in each channel of the channelized packet buffer in accordance with packet sequence data provided by the distributor.

10. The method of claim 6, further comprising:
the channelized schedule queue determining when one or more channels are full; and
discontinuing generating packet definition data for flow control groups associated with full channels.

11. A non-transitory computer-readable storage medium storing programming code which, when used to program a programmable device, configures the programmable device to perform actions comprising:
generating packet definition data for a sequence of packets to be built, each packet uniquely associated with a respective flow control group from a plurality of flow control groups;
storing the packet definition data in a channelized schedule queue, the channelized schedule queue including a plurality of parallel channels, each channel dedicated to storing packet definition data associated with a corresponding one of the plurality of flow control groups;
a distributor combining packet definition data read from the channels of the channelized schedule queue with stateful packet content to create packet forming data;
a plurality of non-channelized packet builder lanes independently building packets in accordance with the packet forming data, each packet builder lane comprising a pipeline wherein each packet must travel through all sequential stages of the pipeline and exit the lane before any subsequent packet in the lane can be completed;
storing built packets in a channelized packet buffer, the channelized packet buffer including a plurality of parallel channels, each channel dedicated to storing packets associated with a corresponding one of the plurality of flow control groups; and
interleaving packets read from the channels of the channelized packet buffer to provide the test traffic.

12. The non-transitory computer-readable storage medium of claim 11, the actions performed further comprising:

receiving flow control packets;

selectively pausing and unpausing one or more flow control groups in response to the received flow control packets; and discontinuing reading packets from channels of the channelized packet buffer associated with paused flow control groups.

13. The non-transitory computer-readable storage medium of claim 11, the actions performed further comprising:

the distributor maintaining a model to predict a capacity of each channel of the channelized packet buffer; and the distributor routing each item of packet definition data to the selected channelized packet builder lane only if a predicted capacity of the corresponding channel of the channelized packet buffer is sufficient to hold the packet defined by the packet definition data.

14. The non-transitory computer-readable storage medium of claim 11, the actions performed further comprising:

storing the built packets in each channel of the channelized packet buffer in accordance with packet sequence data provided by the distributor.

15. The non-transitory computer-readable storage medium of claim 11, the actions performed further comprising:

the channelized schedule queue determining when one or more channels are full; and discontinuing generating packet definition data for flow control groups associated with full channels of the channelized schedule queue.

\* \* \* \* \*